UNITED STATES PATENT OFFICE.

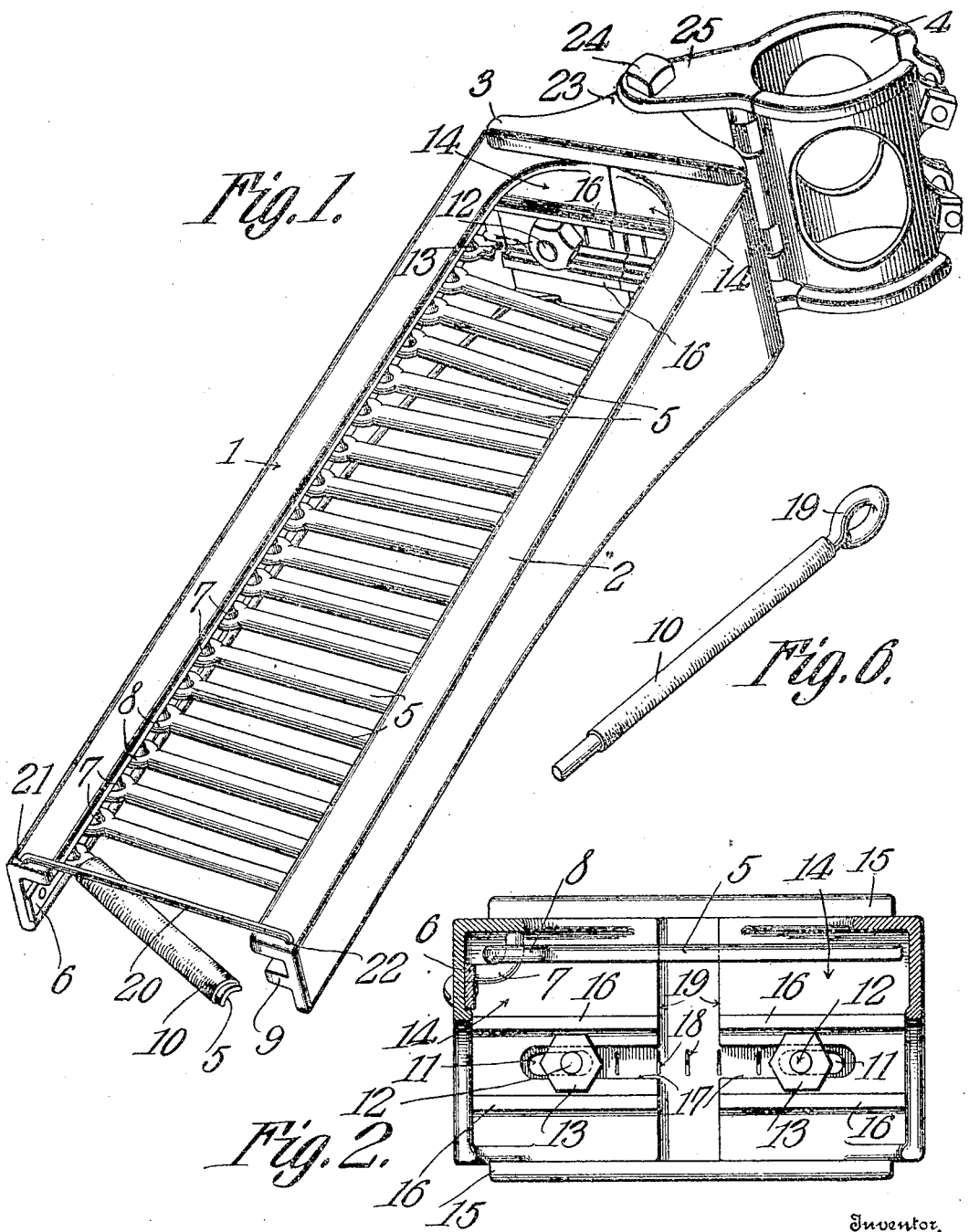
R. D. WIRT.
HOSE RACK.
APPLICATION FILED MAY 19, 1908.
927,623.
Patented July 13, 1909.
2 SHEETS—SHEET 1.
Witnesses:
Inventor,
Reuben D. Wirt.
By
Attorneys.

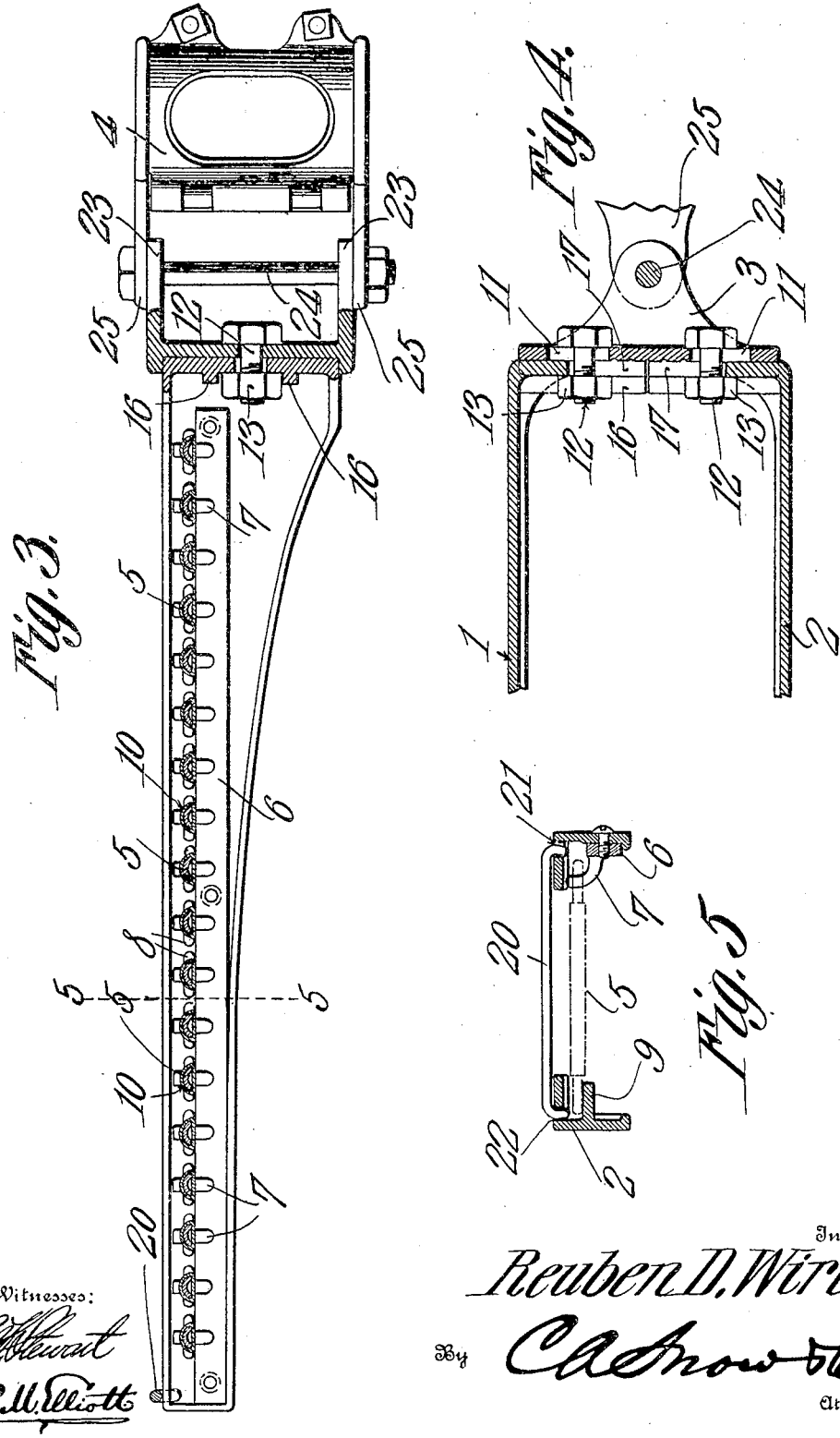

REUBEN D. WIRT, OF PHILADELPHIA, PENNSYLVANIA.

HOSE-RACK.

No. 927,623.  Specification of Letters Patent.  Patented July 13, 1909.

Application filed May 19, 1908. Serial No. 433,730.

*To all whom it may concern:*

Be it known that I, REUBEN D. WIRT, a citizen of the United States, residing at Philadelphia, in the county of Philadelphia and State of Pennsylvania, have invented a new and useful Hose-Rack, of which the following is a specification.

This invention relates generally to hose racks, and particularly to that class employing hose-supporting members or pins that are pivotally connected at one end to one side or arm of the rack and are loosely supported at the other end by the other side or arm of the rack, and in such maner as to permit of their ready disconnection therefrom in the act of withdrawing the hose from the rack.

The objects of the present invention are to improve and simplify the connection between the hose-supporting pins and the rack, whereby all danger of sticking or binding of the former when the hose is being rapidly withdrawn will positively be obviated; to improve the construction of the rack arms and the manner of their attachment to their supporting head, whereby the rack arms shall be capable of adjustment to accommodate hose-supporting pins of sizes varying in length from those designed to support the largest hose employed for fire fighting purposes to those designed to support the smallest hose; and to improve the construction of the hose supporting pins whereby oxidation will be prevented and discoloring and rotting of the hose will be obviated.

With these and other objects in view as will appear as the nature of the invention is better understood, the same consists, generally stated, in a hose rack embodying two arms, a head to which the arms are connected, and an attaching element having a swinging connection with the head and being designed to secure the rack either to a service pipe or to any other suitable support. With one arm is pivotally connected one end of each of the hose-supporting pins, the other ends of which are loosely supported by the other arm and in such manner as to permit ready disconnection therefrom in moments of emergency without danger of sticking or binding. The arms are connected with their supporting head in such manner as to permit ready lateral adjustments whereby to vary the distance between the arms to adapt them for coaction with hose-supporting pins of different lengths, and thus obviate the necessity of constructing the racks in different sizes for this purpose, novel means being provided to insure the proper adjustments without taking measurements. As a matter of specific improvement, the hose-supporting pins are treated with a waterproof substance, or are sheathed in a material that will prevent any rust on the pins from staining or rotting the hose, preferably rubber tubing, although any other material suited to the purpose may be employed.

Further features of novelty and points of advantage of the invention will be hereinafter fully pointed out.

In the accompanying drawings forming a part of this specification, and in which like characters of reference indicate corresponding parts,—Figure 1 is a view in perspective of a hose rack constructed in accordance with the present invention. Fig. 2 is a transverse section. Fig. 3 is a longitudinal section. Fig. 4 is a horizontal section. Fig. 5 is a transverse section taken on the line 5—5 of Fig. 3. Fig. 6 is a perspective detail view of a modified form of hose-supporting pin.

The rack comprises a pair of arms 1 and 2, a head 3 to which the arms are secured, a clamping element 4 pivotally connected with the head, and a series of hose-supporting pins or members 5.

Each of the arms is approximately of an inverted L-shape in cross-section, and the arm 1 has secured to it a bar 6 that carries hooks 7 upon which the hose-supporting pins are swiveled, the latter being provided with eyes 8 for this purpose. The eyes will be of greater diameter than the pins in order to insure freedom of movement and to guard against any danger of binding or sticking when the hose is to be removed. It will be observed by reference to Fig. 1 that the free ends of the hooks bear against or lie close to the horizontal flange of the arm 1, and this will positively preclude any danger of separation of the pins from the hooks. The arm 2 is provided adjacent to its horizontal flange with an intermediate longitudinal flange or pin support 9, that is somewhat less in width than the horizontal flange, and is spaced a sufficient distance therefrom to permit the ready insertion between the two flanges of the free ends of the hose-supporting pins.
As above stated, it is one of the objects of the invention to prevent any rusting or oxidation of the pins, thus to shield the hose from being stained or from rotting, and to secure this object each of the pins is treated with a moisture proof substance, or is inclosed in a sheath 10 of any material that will prevent the passage therethrough of rust, rubber tubing preferably being employed for the purpose.

One of the essential features of this invention is the manner in which the arms are connected with the head 3, whereby to permit of lateral adjustment to adapt one rack to employ hose-supporting pins of different lengths, thus to accommodate hose of various widths. To secure this object, the head is provided with two longitudinally-disposed slots 11 through which extend bolts 12 carrying nuts 13. The ends 14 of the arms extend at right angles to their length and are disposed between a pair of flanges 15 formed integral with the head. Each of the inner faces of the ends 14 is provided with a pair of spaced flanges 16 between which the nuts 13 are disposed, the flanges serving to reinforce the said ends, and each of the ends is further provided with an open-ended slot 17 the two slots being disposed in alinement, and through which the bolts 12 project and operate in conjunction with the nuts to hold the arms at any desired adjustment relatively to the head. In order that the lateral adjustments effected may be accurate without resorting to measurements, the front wall of the head is provided with a series of indicators or channels 18 which determine the proper degree of adjustment of the arms. To effect this latter result, the nuts 13 are loosened and the arms are moved laterally until their inner edges aline with a selected pair of the indicators 18, whereupon the nuts 13 are tightened and thus hold the arms securely in position.

It is to be understood that by preference the hose-supporting pins will be made of a length to accommodate the largest hose used, but where the rock is to be adjusted to accommodate a smaller hose, the undesired length of the pins is cut off. As will be obvious, however, the pins may be made in different lengths to suit standard widths of hose. As shown in Fig. 1, the pins are crescentic in cross section, the bulges being upward, and while this will be their preferred contour, yet if preferred they may be semi-elliptical in cross section without departing from the spirit of the invention.

Instead of employing the form of pin just described, that shown in Fig. 6 may be adopted. This pin 19 is made of a length of wire of the required gage and is rendered non-oxidizable by a rubber sheath 10, or a moisture proof substance.

In order to brace the arms against spreading thus to relieve the ends 14 from strain, there is a keeper 20 provided the terminals of which are bent at right angles to its length and permanently engage orifices 21 and 22 in the horizontal flanges of the arms.

The head 3 is provided with a pair of spaced ears 23 to which are pivotally secured by a bolt 24 a pair of arms or extensions 25 carried by the attaching element 4, the latter being of any preferred construction, but in this instance made in two sections hinged together in order to permit of its being positioned upon a service pipe, or other suitable support. As will be obvious, a plate could be substituted for this attaching element to adapt the rack to be secured to a wall or the like.

It will be seen from the foregoing description that although the improvements herein defined are simple in character, they will be thoroughly efficient for the purposes designed and will obviate certain defects heretofore present in structures of this character.

What is claimed is:—

1. A hose rack comprising a head, a pair of laterally-adjustable arms carried thereby, one of which is provided with a longitudinal flange or support, a bar secured to the other arm and provided with upturned hooks, hose-supporting members having eyes engaging the hooks and having their free ends arranged to engage the flange, and means for bracing the arms against spreading.

2. A hose-rack comprising a head having spaced guide flanges, co-acting laterally adjustable hose-pin supporting arms having angular extensions slidably mounted between the flanges of the head, and means extending through the head and angular extensions of the arms for locking the latter in adjusted position.

3. A hose-rack comprising a head having spaced laterally extending guide flanges, co-acting laterally adjustable hose-pin supporting arms having angular extensions slidably mounted between the flanges of the head, means for locking the arms in adjusted position, and means for determining the degree of adjustment required.

4. A hose-rack comprising a head having spaced guide flanges, co-acting laterally adjustable hose-pin supporting arms having angularly disposed slotted extensions slidably mounted between the guide flanges, and fastening devices carried by the head and extending through the slots in the angular extensions of the arms for locking said arms in adjusted position.

5. A hose-rack comprising a head having spaced guide flanges, co-acting laterally adjustable hose-pin supporting arms having inwardly projected slotted extensions slidably mounted between the guide flanges, ribs disposed above and below the slots in said extensions, bolts carried by the head and extending through the slots in the extensions of the arms, and nuts engaging the threads on the bolts and bearing against said ribs.

6. A hose-rack comprising a head having spaced guide flanges and provided with a plurality of longitudinally disposed slots, coacting hose-pin supporting arms having angular extensions slidably mounted between the flanges of the head and provided with slots opening through the inner ends of the extensions and arranged to register with the slots in the head, threaded bolts extending through said slots, nuts engaging the threads on the bolts, and ribs formed on the angular extensions of the arms and arranged above and below the nuts for locking the latter against rotation.

7. A hose-rack comprising a head, spaced hose-pin supporting arms carried by the head and provided with inwardly extending flanges, a bar secured to one of the arms and provided with upwardly extending hooks, the terminals of which bear against the lower face of the adjacent flange, and hose-supporting members pivotally mounted on said hooks and free to swing laterally between the spaced arms.

8. A hose-rack comprising a head, spaced hose-pin supporting arms carried by the head and having their upper edges bent inwardly to form laterally extending flanges, a bar secured to one of the arms and provided with spaced upwardly extending hooks, the free ends of which are arranged to bear against the lower surface of the adjacent flange, a longitudinal flange carried by the mating arm and spaced from the upper flange of said arm, and hose-supporting members pivotally mounted on the hooks and having their free ends arranged to engage the longitudinal flange, said hose-supporting members being treated to prevent oxidation.

9. A hose-rack comprising a head, co-acting hose-pin supporting members carried by the head and provided at their upper longitudinal edges with inwardly extending flanges, a bar secured to one of the arms and provided with upwardly curved hooks having their free ends arranged to bear against the under side of the adjacent flange, and hose-supporting pins pivotally mounted on the hooks and of concavo-convex cross sectional formation.

10. A hose rack comprising a supporting structure, a plurality of alining hooks secured to said structure, a support secured to said structure and spaced from but parallel with the plurality of hooks, and hose supporting pins engaging the hooks and resting freely on the support.

In testimony that I claim the foregoing as my own, I have hereto affixed my signature in the presence of two witnesses.

REUBEN D. WIRT.

Witnesses:
C. E. S. DOYLE,
FRANK APPLEMAN.